US011470129B1

(12) United States Patent
Uzelac

(10) Patent No.: US 11,470,129 B1
(45) Date of Patent: Oct. 11, 2022

(54) ORIGINATING NUMBER OR ADDRESS-BASED ROUTE DETERMINATION AND ROUTING

(71) Applicant: Level 3 Communications, LLC, Broomfield, CO (US)

(72) Inventor: Adam Uzelac, Rochester, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 17/410,304

(22) Filed: Aug. 24, 2021

Related U.S. Application Data

(60) Provisional application No. 63/216,331, filed on Jun. 29, 2021.

(51) Int. Cl.
| | |
|---|---|
| *H04L 65/1104* | (2022.01) |
| *H04L 65/1046* | (2022.01) |
| *H04Q 3/00* | (2006.01) |
| *H04Q 3/66* | (2006.01) |
| *H04L 65/1053* | (2022.01) |

(52) U.S. Cl.
CPC ...... *H04L 65/1104* (2022.05); *H04L 65/1046* (2013.01); *H04L 65/1053* (2013.01); *H04Q 3/0029* (2013.01); *H04Q 3/66* (2013.01)

(58) Field of Classification Search
None
See application file for complete search history.

(56) References Cited

U.S. PATENT DOCUMENTS

| | | | | |
|---|---|---|---|---|
| 11,087,262 | B2 * | 8/2021 | Storey | .................... G06Q 10/00 |
| 2011/0085541 | A1 * | 4/2011 | Davis | ...................... H04Q 3/66 |
| | | | | 370/352 |
| 2012/0106727 | A1 * | 5/2012 | Kaushal | ............... H04Q 3/0016 |
| | | | | 379/211.01 |
| 2019/0364481 | A1 * | 11/2019 | Silver | ................. H04L 65/1016 |

* cited by examiner

*Primary Examiner* — Younes Naji

(57) ABSTRACT

Novel tools and techniques are provided for implementing originating number or address-based route determination and routing. In various embodiments, a computing system may receive, from a first router among a plurality of routers in a first network operated by a first service provider, first SIP data, the first SIP data indicating a request to initiate a SIP-based media communication session between a calling party at an originating address in an originating network and a called party at a terminating address in a terminating network. The computing system may determine a communication route among a plurality of routes through the plurality of routers in the first network for establishing the SIP-based media communication session, based at least in part on the originating address, and may establish the SIP-based media communication session between the calling party and the called party via the determined communication route.

19 Claims, 11 Drawing Sheets

ORIGINATING NUMBER OR ADDRESS-BASED ROUTE DETERMINATION AND ROUTING

CROSS-REFERENCES TO RELATED APPLICATIONS

This application claims priority to U.S. Patent Application Ser. No. 63/216,331 (the "'331 application"), filed Jun. 29, 2021 by Adam Uzelac, entitled, "Originating Number or Address-Based Route Determination and Routing," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing call or data routing, and, more particularly, to methods, systems, and apparatuses for implementing originating number or address-based route determination and routing.

BACKGROUND

Traditionally, call routing has been based on the called party and the digits dialed. Such routing fails to take into account route determination or call routing that may be conditioned on the calling party and/or service provider or platforms used by the calling party to request the call, which results in supplemental route determination processes being employed ad hoc and/or after initial process. Such ad hoc supplemental route determination processes result in inefficient and potentially inconsistent route determination and call routing.

Hence, there is a need for more robust and scalable solutions for implementing call or data routing, and, more particularly, to methods, systems, and apparatuses for implementing originating number or address-based route determination and routing.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
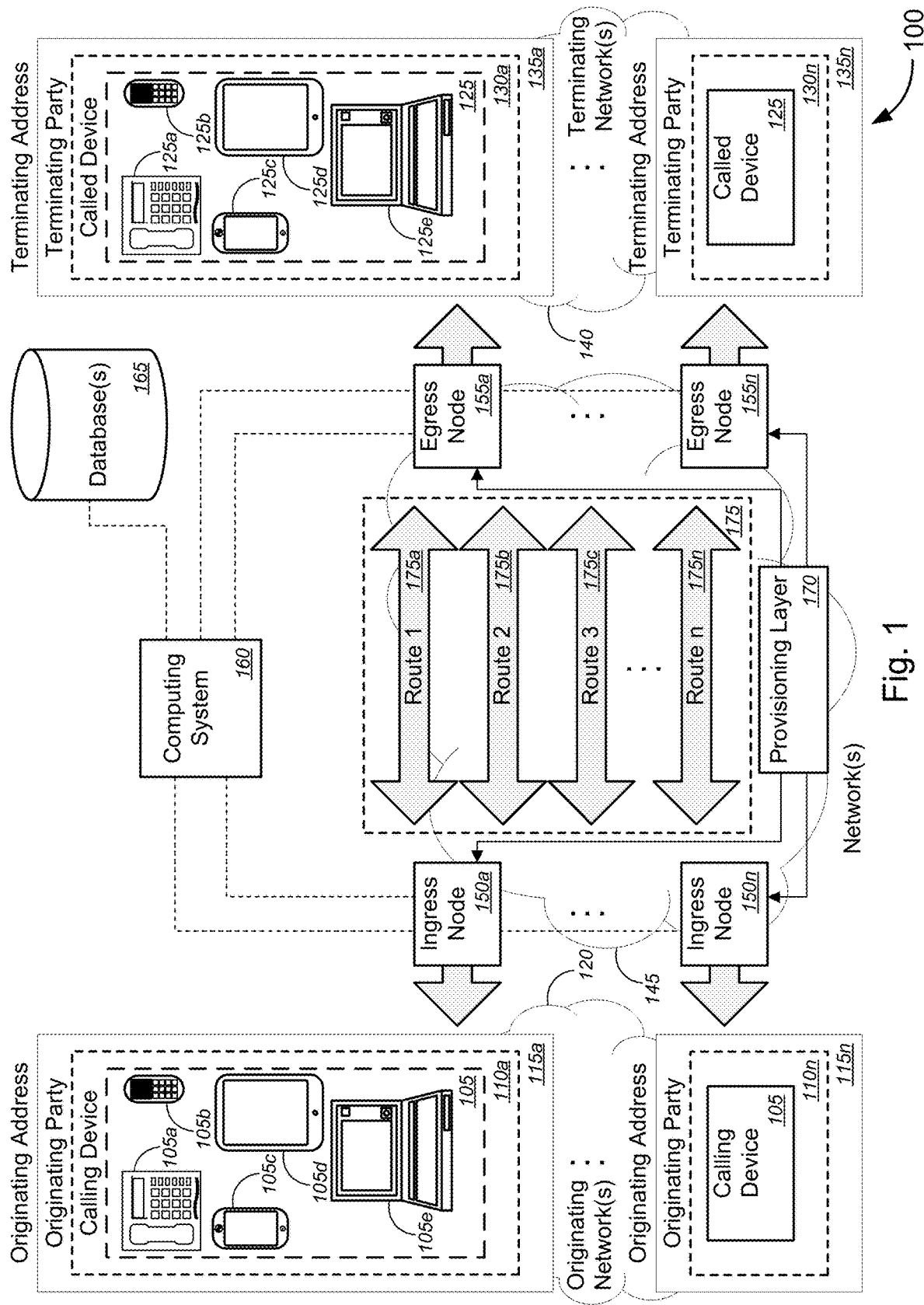
FIG. 1 is a schematic diagram illustrating a system for implementing originating number or address-based route determination and routing, in accordance with various embodiments.

Various embodiments provide tools and techniques for implementing call or data routing, and, more particularly, to methods, systems, and apparatuses for implementing originating number or address-based route determination and routing.

In various embodiments, a computing system may receive, from a first router among a plurality of routers in a first network operated by a first service provider, first SIP data, the first SIP data indicating a request to initiate a SIP-based media communication session between a calling party at an originating address in an originating network and a called party at a terminating address in a terminating network. The computing system may determine a communication route among a plurality of routes through the plurality of routers in the first network for establishing the SIP-based media communication session, based at least in part on the originating address. The computing system may establish the SIP-based media communication session between the calling party and the called party via the determined communication route through the plurality of routers in the first network.

Merely by way of example, in some cases, determining the communication route may comprise determining, using the computing system, a communication route among the plurality of routers in the first network for establishing the SIP-based media communication session, based at least in part on one or more of: whether the calling party is an on-net subscriber; whether the originating network is one of the first network or a network operated by a second service provider with which the first service provider has a peering agreement; which platform the calling party or the originating address is associated with; which trunk group the calling party is assigned to; whether the trunk group to which the calling party is assigned is an exclusive trunk group; whether the trunk group to which the calling party is assigned is a shared trunk group; whether the called party is an on-net subscriber; whether the terminating network is one of the first network or a network operated by a third service provider with which the first service provider has a peering agreement; which platform the called party or the destination address is associated with; which trunk group the called party is assigned to; whether the trunk group to which the called party is assigned is an exclusive trunk group; whether the trunk group to which the called party is assigned is a shared trunk group; whether the terminating address is an incompatible endpoint; or whether any routers or nodes between the originating address are incompatible endpoints; and/or the like.

Alternatively, or additionally, determining the communication route may comprise determining, using the computing system, a route plan, the route plan may include, without limitation, at least one of: a routing solution based on an origination operating company number ("OCN"); a routing solution including all OCNs associated with the first service provider; a routing solution including all OCNs based on the calling party's local routing number ("LRN"); a routing solution that includes overflow routes based on one or more of least cost routing ("LCR") or wide area telephone service ("WATS"); a routing solution that accepts Internet Protocol ("IP") and time-division multiplex ("TDM") originating addresses; a routing solution that accepts IP and TDM terminating routes; a routing solution that pertains only to local or long distance ("LD") toll traffic; a routing solution in which terminating routes are available via standard LCR routing environments; or a routing solution based on traffic exchange agreements ("TEAs") between the first service provider and one or more of a second service provider operating the originating network or a third service provider operating the terminating network; and/or the like.

By routing based at least in part on the originating number or address rather than based only on the terminating number or address, a more robust and efficient route determination and routing approach may be achieved that takes into account more factors for more accurate call routing that also takes into account conditions placed on call routing by peering networks and/or by network conditions, etc.

These and other aspects of the originating number or address-based route determination and routing are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, call routing technology, call routing management technology, data routing technology, data routing management technology, network management technology, and/or the like. In other aspects, certain embodiments, can improve the functioning of user equipment or systems themselves (e.g., call routing systems, call routing management systems, data routing systems, data routing management systems, network management systems, etc.), for example, by receiving, using a computing system and from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network; determining, using the computing system, a communication route among a plurality of routes through the plurality of routers in the first network for establishing the SIP-based media communication session, based at least in part on the originating address; and establishing, using the computing system, the SIP-based media communication session between the calling party and the called party via the determined communication route through the plurality of routers in the first network; and/or the like.

In particular, to the extent any abstract concepts are present in the various embodiments, those concepts can be implemented as described herein by devices, software, systems, and methods that involve specific novel functionality (e.g., steps or operations), such as, using the computing system to determine a communication route among a plurality of routes through the plurality of routers in the first network for establishing the SIP-based media communication session, based at least in part on the originating address (and in some cases, based at least in part on a combination of originating data points and terminating data points, or the like) and to establish the SIP-based media communication session between the calling party and the called party via the determined communication route through the plurality of routers in the first network, and/or the like, to name a few examples, that extend beyond mere conventional computer processing operations. These functionalities can produce tangible results outside of the implementing computer system, including, merely by way of example, optimized route determination and call routing that is robust and efficient, and that takes into account more factors for more accurate call routing that also takes into account conditions placed on call routing by peering networks and/or by network conditions, and/or the like, at least some of which may be observed or measured by customers and/or service providers.

In an aspect, a method may comprise receiving, using a computing system and from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network; determining, using the computing system, a communication route among a plurality of routes through the plurality of routers in the first network for establishing the SIP-based media communication session, based at least in part on the originating address; and establishing, using the computing system, the SIP-based media communication session between the calling party and the called party via the determined communication route through the plurality of routers in the first network.

In some embodiments, the computing system may comprise at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like. In some instances, the SIP-based communication may comprise at least one of a voice over Internet Protocol ("VoIP") call, an IP-based video call, or an instant message over IP, and/or the like. In some cases, at least one of the originating network or the terminating network is the same as the first network. Alternatively, at least one of the originating network or the terminating network is different from the first network.

According to some embodiments, determining the communication route may comprise: determining, using the computing system, a platform through which the calling party sends the first SIP data to request initiation of the SIP-based media communication; identifying, using the computing system, a first set of routes among the plurality of routers through which all SIP-based media communications initiated using the platform are assigned to be routed; and selecting, using the computing system, a first route from among the identified first set of routes, wherein the communication route comprises the selected first route. In some instances, the platform may comprise at least one of a teleconferencing platform, a voice call platform, a video call platform, a messaging platform, a software application-based communications platform, or a web-based communications platform, and/or the like.

Alternatively, or additionally, determining the communication route may comprise: determining, using the computing system, a source group to which the originating address belongs; identifying, using the computing system, a second set of routes among the plurality of routers through which all SIP-based media communications initiated by the members of the source group are assigned to be routed; and selecting, using the computing system, a second route from among the identified second set of routes, wherein the communication route comprises the selected second route. In some cases, the source group may comprise one of an entity to which the calling party belongs, a trunk group assigned exclusively to the entity, or a trunk group assigned to the calling party, and/or the like.

Alternatively, or additionally, determining the communication route may comprise: determining, using the computing system, whether a first set of conditions is satisfied, the first set of conditions comprising that the request to initiate the SIP-based media communication session originates on a shared trunk group, that the calling party is an on-network ("on-net") subscriber, and that the terminating address is on a collaboration platform; based on a determination that the first set of conditions is satisfied, identifying, using the computing system, a third set of routes among the plurality of routers through which SIP-based media communications satisfying the first set of conditions are assigned to be routed; and selecting, using the computing system, a third route from among the identified third set of routes, wherein the communication route comprises the selected third route.

Alternatively, or additionally, determining the communication route may comprise: extracting, using the computing system, one or more first originating data points and one or more first terminating data points from the received first SIP data; querying a database, using the computing system, for one or more second originating data points and one or more second terminating data points; based on a combination of the one or more first originating data points, the one or more second originating data points, the one or more second originating data points, and the one or more second terminating data points, identifying, using the computing system, a fourth set of routes among the plurality of routers through which SIP-based media communications should be routed; and selecting, using the computing system, a fourth route from among the identified fourth set of routes, wherein the communication route comprises the selected fourth route.

In some embodiments, the one or more first originating data points may comprise at least one of an originating address, an originating telephone number, an originating identification code, an originating operating company number ("OCN"), an originating local routing number ("LRN"), an originating trunk group classification, or an originating network identifier, and/or the like. Likewise, the one or more first terminating data points may comprise at least one of a terminating address, a terminating telephone number, a terminating identification code, a terminating OCN, a terminating LRN, a terminating trunk group classification, or a terminating network identifier, and/or the like.

According to some embodiments, the one or more second originating data points may comprise at least one of an indication that the calling party is an on-net subscriber, an indication that the calling party is an off-net subscriber, an indication of which service provider is associated with the originating telephone number based on one or more of local exchange routing guide ("LERG") data, number portability administration center ("NPAC") data, or local routing number ("LRN") data, an indication regarding a trunk group classification associated with the originating telephone number, or an indication regarding network identity associated with the originating address, and/or the like. Likewise, the one or more second terminating data points may comprise at least one of an indication that the called party is an on-net subscriber, an indication that the called party is an off-net subscriber, an indication of which service provider is associated with the terminating telephone number based on one or more of LERG data, NPAC data, or LRN data, an indication regarding a trunk group classification associated with the terminating telephone number, or an indication regarding network identity associated with the terminating address, and/or the like.

Merely by way of example, in some cases, determining the communication route may comprise determining, using the computing system, a communication route among the plurality of routers in the first network for establishing the SIP-based media communication session, based at least in part on one or more of: whether the calling party is an on-net subscriber; whether the originating network is one of the first network or a network operated by a second service provider with which the first service provider has a peering agreement; which platform the calling party or the originating address is associated with; which trunk group the calling party is assigned to; whether the trunk group to which the calling party is assigned is an exclusive trunk group; whether the trunk group to which the calling party is assigned is a shared trunk group; whether the called party is an on-net subscriber; whether the terminating network is one of the first network or a network operated by a third service provider with which the first service provider has a peering agreement; which platform the called party or the destination address is associated with; which trunk group the called party is assigned to; whether the trunk group to which the called party is assigned is an exclusive trunk group; whether the trunk group to which the called party is assigned is a shared trunk group; whether the terminating address is an incompatible endpoint; or whether any routers or nodes between the originating address are incompatible endpoints; and/or the like.

In some embodiments, determining the communication route may comprise determining, using the computing system, a route plan, the route plan comprising at least one of: a routing solution based on an origination operating company number ("OCN"); a routing solution including all OCNs associated with the first service provider; a routing solution including all OCNs based on the calling party's local routing number ("LRN"); a routing solution that includes overflow routes based on one or more of least cost routing ("LCR") or wide area telephone service ("WATS"); a routing solution that accepts Internet Protocol ("IP") and time-division multiplex ("TDM") originating addresses; a routing solution that accepts IP and TDM terminating routes; a routing solution that pertains only to local or long distance ("LD") toll traffic; a routing solution in which terminating routes are available via standard LCR routing environments; or a routing solution based on traffic exchange agreements ("TEAs") between the first service provider and one or more of a second service provider operating the originating network or a third service provider operating the terminating network; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network; determine a communication route among a plurality of routes through the plurality of routers in the first network for establishing the SIP-based media communication session, based at least in part on the originating address; and establish the SIP-based media communication session between the calling party and the called party via the determined communication route through the plurality of routers in the first network.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network; determine a communication route among a plurality of routes through the plurality of routers in the first network for establishing the SIP-based media communication session, based at least in part on the originating address; and establish the SIP-based media communication session between the calling party and the called party via the determined communication route through the plurality of routers in the first network.

In some embodiments, the computing system may comprise at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like. In some instances, the SIP-based communication may comprise at least one of a voice over Internet Protocol ("VoIP") call, an IP-based video call, or an instant message over IP, and/or the like.

Merely by way of example, in some cases, determining the communication route may comprise determining a route plan, the route plan comprising at least one of: a routing solution based on an origination operating company number ("OCN"); a routing solution including all OCNs associated with the first service provider; a routing solution including all OCNs based on the calling party's local routing number ("LRN"); a routing solution that includes overflow routes based on one or more of least cost routing ("LCR") or wide area telephone service ("WATS"); a routing solution that accepts Internet Protocol ("IP") and time-division multiplex ("TDM") originating addresses; a routing solution that accepts IP and TDM terminating routes; a routing solution that pertains only to local or long distance ("LD") toll traffic; a routing solution in which terminating routes are available via standard LCR routing environments; or a routing solution based on traffic exchange agreements ("TEAs") between the first service provider and one or more of a second service provider operating the originating network or a third service provider operating the terminating network; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing call or data routing, and, more particularly, to methods, systems, and apparatuses for implementing originating number or address-based route determination and routing, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing originating number or address-based route determination and routing, in accordance with various embodiments.

In the non-limiting embodiment of FIG. 1, system 100 may comprise a calling device 105 that is associated with an originating party 110a among a plurality of originating parties 110a-110n (collectively, "originating parties 110" or "calling parties 110" or the like) at corresponding originating addresses 115a-115n (collectively, "source addresses 115" or the like) in an originating network(s) 120. In some instances, the calling device 105 (also referred to as a "user device 105" or the like) may include, but is not limited to, at least one of a telephone 105a, a mobile phone 105b, a smart phone 105c, a tablet computer 105d, or a laptop computer 105e, and/or the like. System 100 likewise may comprise a called device 125 that is associated with a terminating party 130a among a plurality of terminating parties 130a-130n (collectively, "terminating parties 130" or "called parties 130" or the like) at corresponding terminating addresses 135a-135n (collectively, "terminating addresses 135" or the like) in a terminating network(s) 140. In some instances, the called device 125 (also referred to as a "user device 125" or the like), similar to calling device 105, may include, but is not limited to, at least one of a telephone 125a, a mobile phone 125b, a smart phone 105c, a tablet computer 105d, or a laptop computer 105e, and/or the like.

System 100 may further comprise network(s) 145 that communicatively couple calling devices 105 in originating network(s) 120 with called devices 125 in terminating network(s) 140. System 100 may further comprise a plurality of ingress nodes 150a-150n (collectively, "ingress nodes 150" or the like) that receives network traffic into network(s) 145 from at least one of calling devices 105, originating addresses 115a-115n, and/or originating network(s) 120, while sending network traffic from network(s) 145 to at least one of calling devices 105, originating addresses 115a-115n, and/or originating network(s) 120. System 100 may further comprise a plurality of egress nodes 155a-155n (collectively, "egress nodes 155" or the like) that relays network traffic within network(s) 145 to at least one of called devices 125 and/or terminating addresses 135a-135n, while receiving network traffic from at least one of called devices 125 and/or terminating addresses 135a-135n. Ingress nodes 150 and egress nodes 155 may otherwise be similar, if not identical, to each other in terms of functionality, configurations, and/or form-factor, or the like. Herein, "ingress" and "egress" respectively refer to entry into and exit out of the network(s) 145 of session initiation protocol ("SIP") data indicating a request to initiate a SIP-based media communication session between a calling party (e.g., originating party 110a, or the like) at an originating address (e.g., originating address 115a, or the like) in an originating network (e.g., originating network(s) 120, or the like) and a called party (e.g., terminating party 130a, or the like) at a terminating address (e.g., terminating address 135a, or the like) in a terminating network (e.g., terminating network(s) 140, or the like). Herein also, SIP-based communication may include, without limitation, at least one of a voice over Internet Protocol ("VoIP") call, an IP-based video call, or an instant message over IP, and/or the like.

In some embodiments, networks 120, 140, and 145 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the networks 120, 140, and 145 may include an access network of the service provider (e.g., an Internet service provider ("ISP")). In another embodiment, the networks 120, 140, and 145 may include a core network of the service provider and/or the Internet. In some instances, at least one of the originating network(s) 120 or the terminating network(s) 140 is the same as the network(s) 145. Alternatively, at least one of the originating network(s) 120 or the terminating network(s) 140 is different from the network(s) 145.

According to some embodiments, system 100 may further comprise a computing system 160 and corresponding database(s) 165. In some instances, computing system 160 may include, without limitation, at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like. System 100 may further comprise provisioning layer 170 of network (s) 145 that may be configured to receive network routing instructions from computing system 160 and to send instructions to one or more ingress nodes 150 and/or one or more egress nodes 155 to control routing of network traffic data or SIP data/requests within network(s) 145.

In operation, computing system 160 may receive, from a first router (e.g., ingress node 150a, or the like) among a plurality of routers (e.g., the plurality of ingress nodes 150a-150n and/or the plurality of egress nodes 155a-155n, or the like) in a first network (e.g., network(s) 145, or the like) operated by a first service provider, first SIP data, the first SIP data indicating a request to initiate a SIP-based media communication session between a calling party (e.g., originating party 110a, or the like) at an originating address (e.g., originating address 115a, or the like) in an originating network (e.g., originating network(s) 120, or the like) and a called party (e.g., terminating party 130a, or the like) at a terminating address (e.g., terminating address 135a, or the like) in a terminating network (e.g., terminating network(s) 140, or the like).

The computing system 160 may determine a communication route (e.g., route 1 175a, or the like) among a plurality of routes (e.g., routes 175a-175n, or the like) through the plurality of routers (e.g., the plurality of ingress nodes 150a-150n and/or the plurality of egress nodes 155a-155n, or the like) in the first network (e.g., network(s) 145, or the like) for establishing the SIP-based media communication session, based at least in part on the originating address (e.g., originating address 115a, or the like). The computing system 160 may then establish the SIP-based media communication session between the calling party (e.g., originating party 110a, or the like) and the called party (e.g., terminating party 130a, or the like) via the determined communication route (e.g., route 1 175a, or the like) through the plurality of routers in the first network (e.g., network(s) 145, or the like).

In some embodiments, determining the communication route may comprise computing system 160: determining a platform through which the calling party sends the first SIP data to request initiation of the SIP-based media communication; identifying a first set of routes among the plurality of routers through which all SIP-based media communications initiated using the platform are assigned to be routed; and selecting a first route from among the identified first set of routes, where the communication route comprises the selected first route. According to some embodiments, the platform may include, without limitation, at least one of a teleconferencing platform, a voice call platform, a video call platform, a messaging platform, a software application-based communications platform, or a web-based communications platform, and/or the like.

Alternatively, or additionally, determining the communication route may comprise computing system 160: determining a source group to which the originating address belongs; identifying a second set of routes among the plurality of routers through which all SIP-based media communications initiated by the members of the source group are assigned to be routed; and selecting a second route from among the identified second set of routes, where the communication route comprises the selected second route. In some embodiments, the source group may include, but is not limited to, one of an entity to which the calling party belongs, a trunk group assigned exclusively to the entity, or a trunk group assigned to the calling party, and/or the like.

Alternatively, or additionally, determining the communication route may comprise computing system 160: determining whether a first set of conditions is satisfied, the first set of conditions comprising that the request to initiate the SIP-based media communication session originates on a shared trunk group, that the calling party is an on-network ("on-net") subscriber (i.e., a subscriber of the service provider who owns or operates the network(s) 145, or the like), and that the terminating address is on a collaboration platform; based on a determination that the first set of conditions is satisfied, identifying a third set of routes among the plurality of routers through which SIP-based media communications satisfying the first set of conditions are assigned to be routed; and selecting a third route from among the identified third set of routes, where the communication route comprises the selected third route.

Alternatively, or additionally, determining the communication route may comprise computing system 160: extracting one or more first originating data points and one or more first terminating data points from the received first SIP data; querying a database for one or more second originating data points and one or more second terminating data points; based on a combination of the one or more first originating data points, the one or more second originating data points, the one or more second originating data points, and the one or more second terminating data points, identifying a fourth set of routes among the plurality of routers through which SIP-based media communications should be routed; and selecting a fourth route from among the identified fourth set of routes, where the communication route comprises the selected fourth route.

According to some embodiments, the one or more first originating data points may include, without limitation, at least one of an originating address, an originating telephone number, an originating identification code, an originating operating company number ("OCN"), an originating local routing number ("LRN"), an originating trunk group classification, or an originating network identifier, and/or the like. Similarly, the one or more first terminating data points may include, but are not limited to, at least one of a terminating address, a terminating telephone number, a terminating identification code, a terminating OCN, a terminating LRN, a terminating trunk group classification, or a terminating network identifier, and/or the like.

In some embodiments, the one or more second originating data points may include, without limitation, at least one of an indication that the calling party is an on-net subscriber, an indication that the calling party is an off-net subscriber, an indication of which service provider is associated with the originating telephone number based on one or more of local exchange routing guide ("LERG") data, number portability administration center ("NPAC") data, or local routing number ("LRN") data, an indication regarding a trunk group classification associated with the originating telephone number, or an indication regarding network identity associated with the originating address, and/or the like. Likewise, the one or more second terminating data points may include, but are not limited to, at least one of an indication that the called party is an on-net subscriber, an indication that the called party is an off-net subscriber, an indication of which service provider is associated with the terminating telephone number based on one or more of LERG data, NPAC data, or LRN data, an indication regarding a trunk group classification associated with the terminating telephone number, or an indication regarding network identity associated with the terminating address, and/or the like.

Merely by way of example, in some cases, determining the communication route may comprise determining, using the computing system, a communication route among the plurality of routers in the first network for establishing the SIP-based media communication session, based at least in part on one or more of: whether the calling party is an on-net subscriber; whether the originating network is one of the first network or a network operated by a second service provider with which the first service provider has a peering agreement; which platform the calling party or the originating address is associated with; which trunk group the calling party is assigned to; whether the trunk group to which the calling party is assigned is an exclusive trunk group; whether the trunk group to which the calling party is assigned is a shared trunk group; whether the called party is an on-net subscriber; whether the terminating network is one of the first network or a network operated by a third service provider with which the first service provider has a peering agreement; which platform the called party or the destination address is associated with; which trunk group the called party is assigned to; whether the trunk group to which the called party is assigned is an exclusive trunk group; whether the trunk group to which the called party is assigned is a shared trunk group; whether the terminating address is an incompatible endpoint; or whether any routers or nodes between the originating address are incompatible endpoints; and/or the like.

Alternatively, or additionally, determining the communication route may comprise determining, using the computing system, a route plan, the route plan may include, without limitation, at least one of: a routing solution based on an origination operating company number ("OCN"); a routing solution including all OCNs associated with the first service provider; a routing solution including all OCNs based on the calling party's local routing number ("LRN"); a routing solution that includes overflow routes based on one or more of least cost routing ("LCR") or wide area telephone service ("WATS"); a routing solution that accepts Internet Protocol ("IP") and time-division multiplex ("TDM") originating addresses; a routing solution that accepts IP and TDM terminating routes; a routing solution that pertains only to local or long distance ("LD") toll traffic; a routing solution in which terminating routes are available via standard LCR routing environments; or a routing solution based on traffic exchange agreements ("TEAs") between the first service provider and one or more of a second service provider operating the originating network or a third service provider operating the terminating network; and/or the like.

These and other functions of the system 100 (and its components) are described in greater detail below with respect to FIGS. 2-4.

Figure 2:
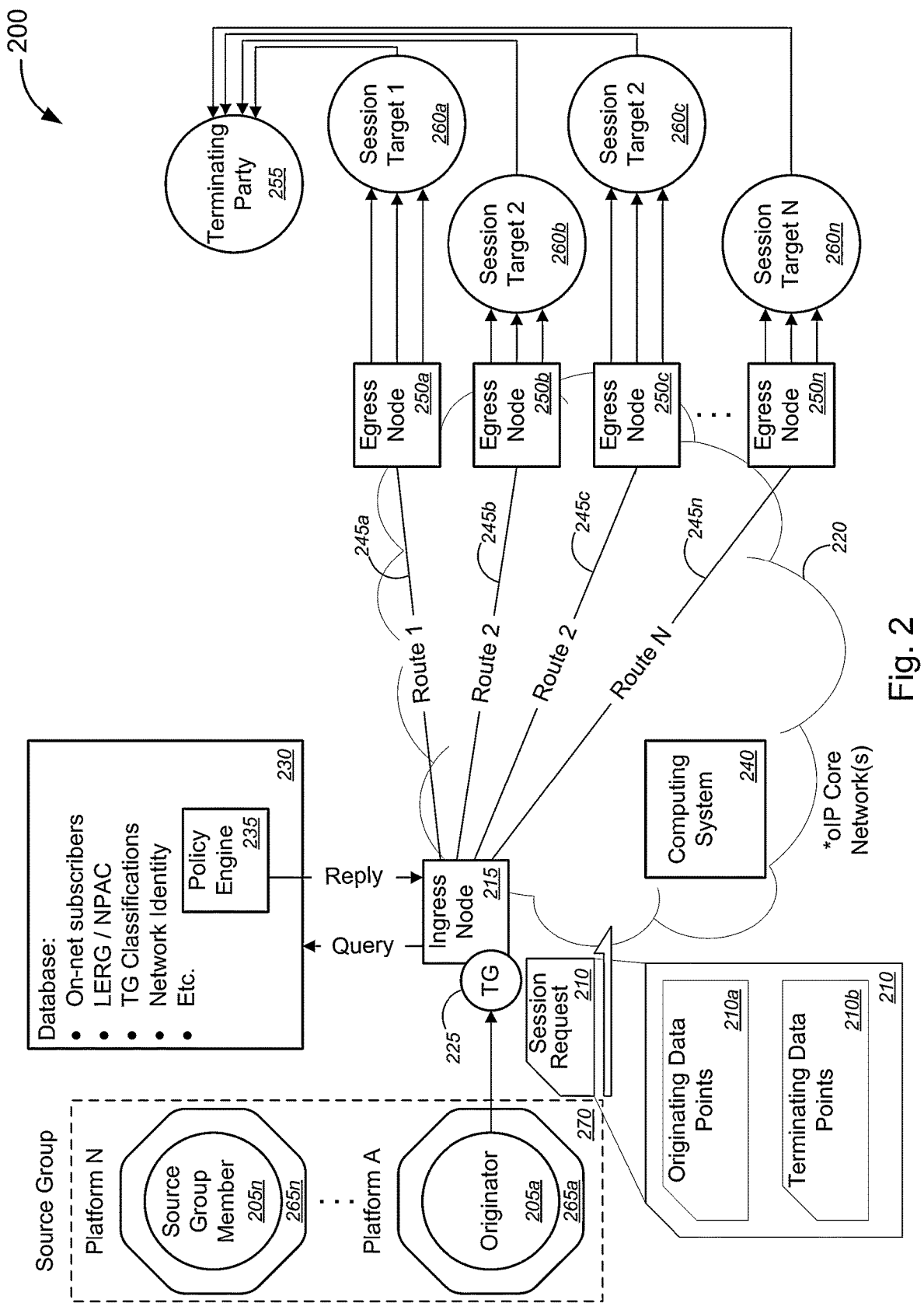
FIG. 2 is a schematic diagram illustrating a non-limiting example of originating number or address-based route determination and routing, in accordance with various embodiments.

FIG. 2 is a schematic diagram illustrating a non-limiting example 200 of originating number or address-based route determination and routing, in accordance with various embodiments.

With reference to the non-limiting example 200 of FIG. 2, an originator 205a (also referred to as "a calling party" or "originating party" or the like; similar to originating party 110 of FIG. 1, or the like) may send a session request 210 to initiate a SIP-based media communication session between the originator 205a and a terminating party 255 (similar to terminating party 130 of FIG. 1, or the like). The SIP-based request is received at an ingress node 215 of *oIP core network(s) 220 (also referred to herein as "first network," or the like) that is associated with the originator 205a or closest to the originator 205a, in some cases, via trunk group ("TG") 225, or the like. Herein, "*oIP" may refer to any one or a combination of Voice over Internet Protocol ("VoIP") service, Video over IP service, and/or Text over IP ("ToIP") service, or the like. In some cases, the session request 210 may include (first) originating data points 210a and (first) terminating data points 210b.

In response to receiving the session request 210, the ingress node 215 may query a database 230 to gather network originating and terminating data points (also referred to herein as "second originating data points" and "second terminating data points," or the like). In some cases, a policy engine 235 (which may be part of the database 230 (as shown in FIG. 2) or may be separate yet communicatively coupled to database 230 (not shown)) may generate a response to the query.

According to some embodiments, each of the first originating data points 210a or the first terminating data points 210b may include, without limitation, at least one of an originating address, an originating telephone number, an originating identification code, an originating operating company number ("OCN"), an originating local routing number ("LRN"), an originating trunk group classification, or an originating network identifier, and/or the like. In some embodiments, each of the second originating data points or the second terminating data points may include, without limitation, at least one of an indication that the calling party is an on-net subscriber, an indication that the calling party is an off-net subscriber, an indication of which service provider is associated with the originating telephone number based on one or more of local exchange routing guide ("LERG") data, number portability administration center ("NPAC") data, or local routing number ("LRN") data, an indication regarding a trunk group classification associated with the originating telephone number, or an indication regarding network identity associated with the originating address, and/or the like.

Alternatively, computing system 240 (similar to computing system 160 of FIG. 1, or the like) may receive the session request 210 from the ingress node 215, and may query database 230 (instead of the ingress node 215 querying the database 230). The computing system 240 may then receive the reply from the database 230 and/or the policy engine 235, either indirectly via ingress node 215 (and any intermediate nodes in network(s) 220 between database 230 and computing system 240) or directly (i.e., not via ingress node 215; although via any intermediate nodes in the network(s) 220 between database 230 and computing system 240). Computing system 240 may then determine a communication route 245 among a plurality of routes 245a-245n through the plurality of nodes (including ingress node 215, egress nodes 250a-250n, and any intermediate nodes (not shown)) in the network(s) 220 for establishing the SIP-based media communication session, based at least in part on the originating address or one or more originating data points (e.g., first and/or second originating data points, or the like), and in some cases, based also in part on one or more terminating data points (e.g., first and/or second terminating data points, or the like).

In some embodiments, the computing system 240 may determine the communication route 245 for establishing the SIP-based media communication session, based at least in part on one or more of: (1) whether the calling party is an on-net subscriber; (2) whether the originating network is one of the first network or a network operated by a second service provider with which the first service provider has a peering agreement; (3) which platform (e.g., platform 265a-265n, or the like) the calling party or the originating address is associated with; (4) which trunk group the calling party is assigned to; (5) whether the trunk group to which the calling party is assigned is an exclusive trunk group; (6) whether the trunk group to which the calling party is assigned is a shared trunk group; (7) whether the called party is an on-net subscriber; (8) whether the terminating network is one of the first network or a network operated by a third service provider with which the first service provider has a peering agreement; (9) which platform the called party or the destination address is associated with; (10) which trunk group the called party is assigned to; (11) whether the trunk group to which the called party is assigned is an exclusive trunk group; (12) whether the trunk group to which the called party is assigned is a shared trunk group; (13) whether the terminating address is an incompatible endpoint; or (14) whether any routers or nodes between the originating address are incompatible endpoints; and/or the like. According to some embodiments, the platform (e.g., one of platform 265a-265n) may include, without limitation, at least one of a teleconferencing platform, a voice call platform, a video call platform, a messaging platform, a software application-based communications platform, or a web-based communications platform, and/or the like. In some cases, determining the communication route may alternatively or additionally be based at least in part on the source group 270 to which the originator 205a belongs. In some embodiments, the source group 270 may include, but is not limited to, one of an entity to which the originator 205 belongs, a trunk group assigned exclusively to the entity (e.g., TG 325, or the like), or a trunk group assigned to the originator 205 (e.g., TG 325, or the like), and/or the like.

Alternatively, or additionally, determining the communication route may comprise computing system 240 determining a route plan, which may include, without limitation, at least one of: (a) a routing solution based on an origination operating company number ("OCN"); (b) a routing solution including all OCNs associated with the first service provider; (c) a routing solution including all OCNs based on the calling party's local routing number ("LRN"); (d) a routing solution that includes overflow routes based on one or more of least cost routing ("LCR") or wide area telephone service ("WATS"); (e) a routing solution that accepts Internet Protocol ("IP") and time-division multiplex ("TDM") originating addresses; (f) a routing solution that accepts IP and TDM terminating routes; (g) a routing solution that pertains only to local or long distance ("LD") toll traffic; (h) a routing solution in which terminating routes are available via standard LCR routing environments; (i) or a routing solution based on traffic exchange agreements ("TEAs") between the first service provider and one or more of a second service provider operating the originating network or a third service provider operating the terminating network; and/or the like.

The computing system 240 may subsequently establish the SIP-based media communication session between the originator 205a and the terminating party 255 via the determined communication route 245 through the plurality of nodes in the network(s) 220, via an egress node 250 corresponding to the determined communication route 245 and via a corresponding session target 260 among a plurality of session targets 260a-260n. In some embodiments, the plurality of session targets 260a-260n may include, but is not limited to, an access network associated with the service provider that owns or operates network(s) 220, a peering network that is associated with a third party service provider (i.e., a service provider separate from the service provider that owns or operates network(s) 220), and/or the like. Non-limiting examples of route determinations are described below with respect to FIGS. 3A-3D. Regardless, the computing system 240 may determine whether any endpoints (or intermediate nodes, or session targets, etc.) are incompatible with network(s) 220, and if so, the computing system 240 may determine alternative routes to avoid routing through the incompatible endpoints (or intermediate nodes, or session targets, etc.).

FIGS. 3A-3D (collectively, "FIG. 3") are schematic diagrams illustrating various other non-limiting examples 300, 300', 300", and 300''' of originating number or address-based route determination and routing, in accordance with various embodiments. In FIG. 3, originator 305, session request 310 (including originating data points 310a and terminating data points 310b), ingress node 315, *oIP core network(s) 320, trunk group 325, database 330, policy engine 335, computing system 340, communication routes 345a-345d, egress nodes 350a-350d, terminating party 355, session targets 360a-360d, platform 365a, and source group 370 may correspond to originator 205, session request 210 (including originating data points 210a and terminating data points 210b), ingress node 215, *oIP core network(s) 220, trunk group 225, database 230, policy engine 235, computing system 240, communication routes 245a-245n, egress nodes 250a-250n, terminating party 255, session targets 260a-260n, platform 265a-265n, and source group 270, respectively, of FIG. 2, and descriptions of these components in FIG. 2 are applicable to the corresponding components in FIG. 3, and vice versa.

Figure 3A:
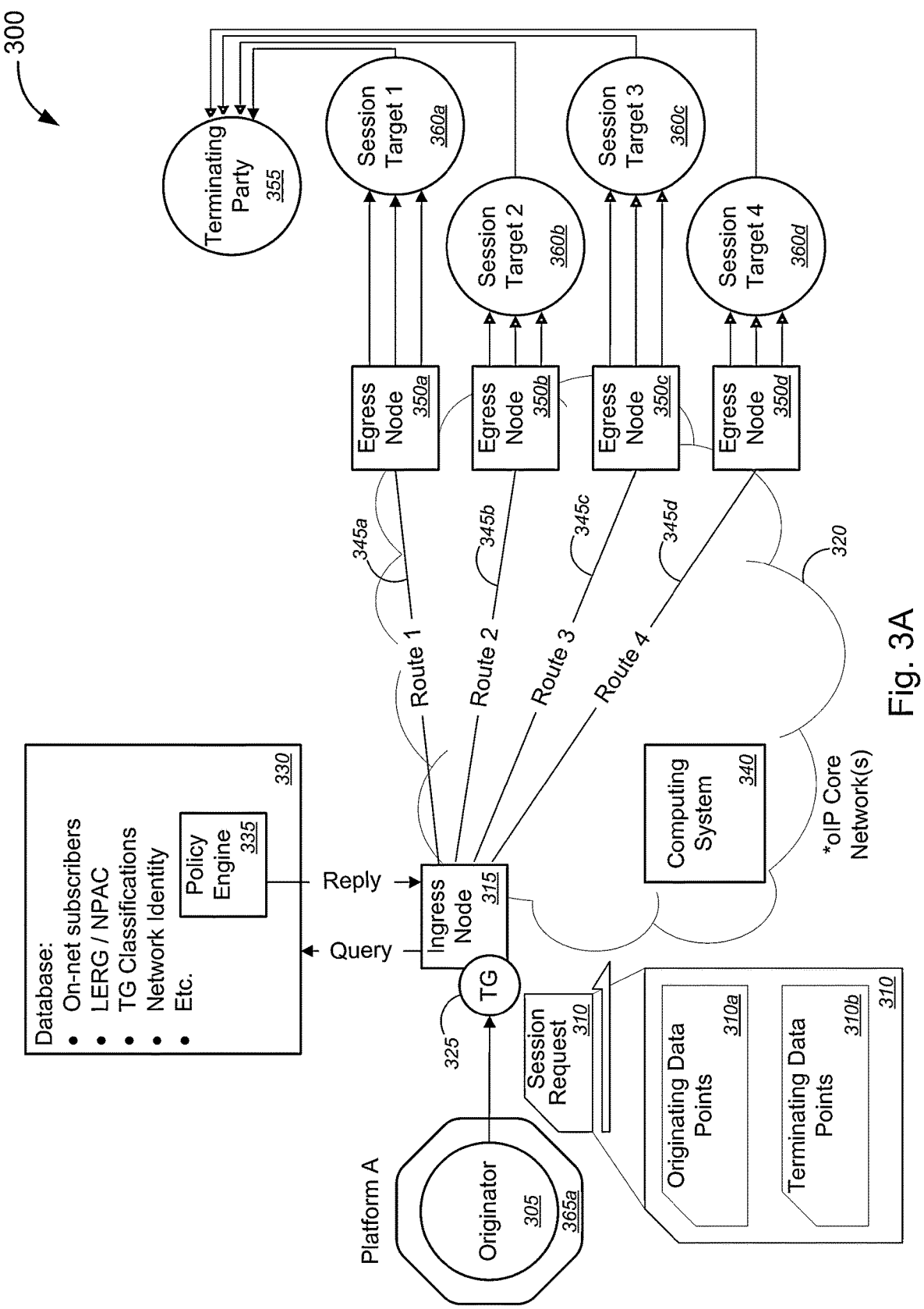
FIGS. 3A-3D are schematic diagrams illustrating various other non-limiting examples of originating number or address-based route determination and routing, in accordance with various embodiments.

Turning to FIG. 3A, determining the communication route (as described above with respect to FIG. 2) may comprise computing system 340: determining a platform (in this case, platform A 365a, or the like) through which the originator 305 sends the session request 310 to request initiation of the SIP-based media communication; identifying a first set of routes 345a-345d among the plurality of nodes in network(s) 320 through which all SIP-based media communications initiated using the platform are assigned to be routed; and selecting a first route 345a from among the identified first set of routes 345a-345d, where the determined communication route comprises the selected first route 345a. According to some embodiments, the platform (e.g., platform A 365a) may include, without limitation, at least one of a teleconferencing platform (e.g., GoToMeeting®, Microsoft Teams®, WebEx®, or Zoom™, etc.), a voice call platform (e.g., a platform associated with a particular cellular provider (e.g., AT&T®, Verizon®, T-Mobile, Google Fi®, Lumen®, etc.), etc.), a video call platform (e.g., Microsoft Teams®, Skype®, WebEx®, or Zoom™, etc.), a messaging platform (e.g., Facebook Messenger, WhatsApp®, WeChat®, Skype®, etc.), a software application-based communications platform (e.g., Facebook Messenger, WhatsApp®, WeChat®, Skype®, Microsoft Teams®, or Zoom™, etc.), or a web-based communications platform (e.g., WebEx® or Zoom™, etc.), and/or the like.

For example, if the TG of origination is used exclusively for traffic from a platform that will only have on-network ("on-net") telephone numbers (i.e., telephone numbers of a subscriber(s) of the service provider who owns or operates the network(s) 320, or the like) as the calling party or originator 305, then the computing system may select route 1 345a. Alternatively, if any originator (e.g., originator 305) in the network(s) 320 uses platform A 365a, then the computing system may select route 1 345a. Once the route has been selected, the computing system 340 may establish the SIP-based media communication session between the calling party (i.e., originator 305, or the like) and the called party (i.e., terminating party 355, or the like) via the determined communication route (e.g., route 1 345a, or the like) through the plurality of nodes in the network (e.g., network(s) 320, or the like), and via a session target (in this case, session target 1 360a) among a plurality of session targets 360a-360n. In some cases, the session targets 360a-360n may each include, but is not limited to, an access network associated with the service provider that owns or operates network(s) 320, a peering network that is associated with a third party service provider (i.e., a service provider separate from the service provider that owns or operates network(s) 320), and/or the like.

Figure 3B:
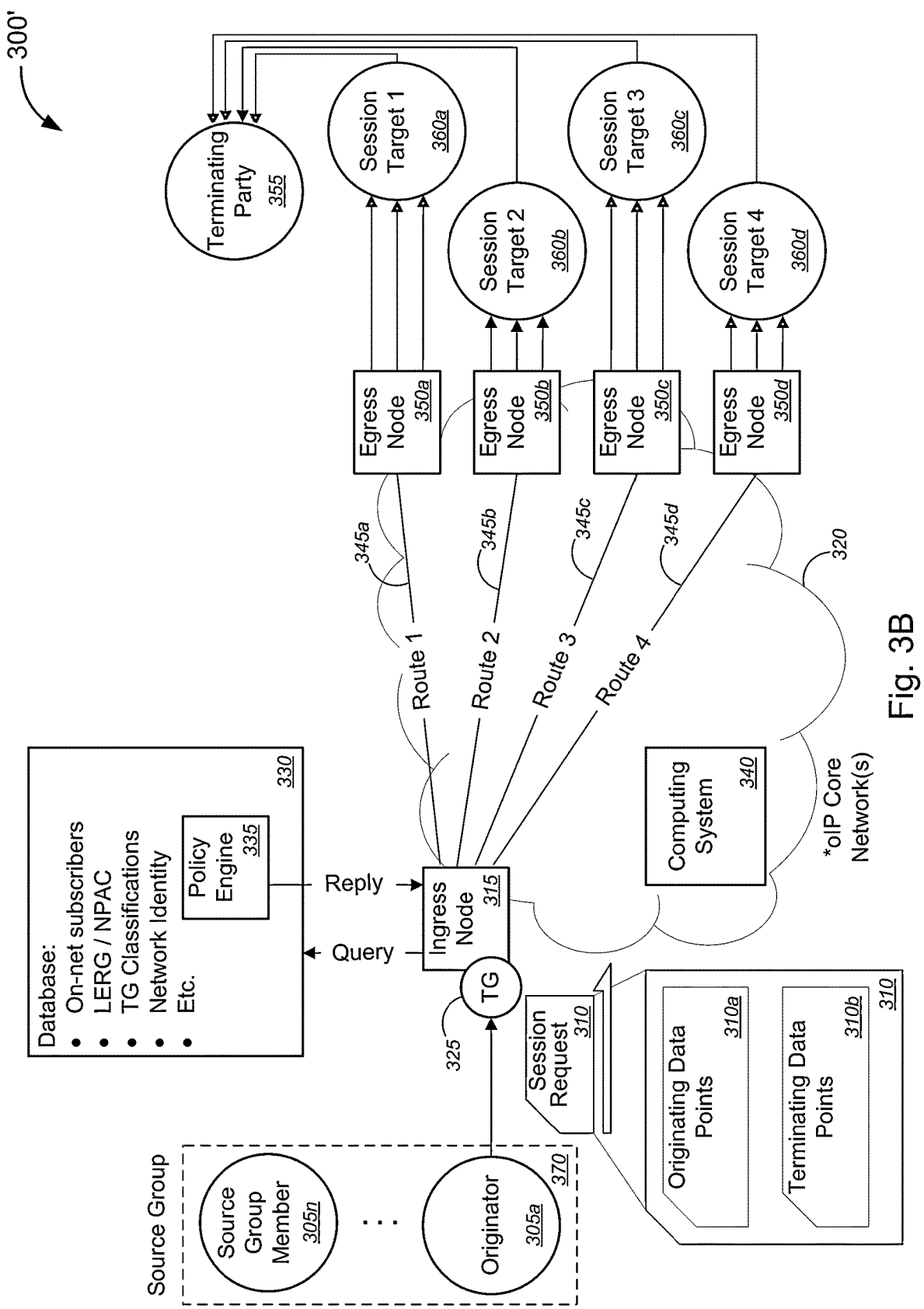

Alternatively, or additionally, referring to FIG. 3B, determining the communication route (as described above with respect to FIG. 2) may comprise computing system 340: determining a source group (e.g., source group 370) to which the originating address belongs; identifying a second set of routes 345a-345d among the plurality of nodes in network(s) 320 through which all SIP-based media communications initiated by the members of the source group are assigned to be routed; and selecting a second route 345b from among the identified second set of routes 345a-345d, where the determined communication route comprises the selected second route 345b. In some embodiments, the source group may include, but is not limited to, one of an entity to which the originator 305 belongs, a trunk group assigned exclusively to the entity (e.g., TG 325, or the like), or a trunk group assigned to the originator 305 (e.g., TG 325, or the like), and/or the like.

For example, if the session request 310 or call originates on a shared TG (i.e., a trunk group that carries calls that originate from more than one service type or more than one carrier, or the like), the calling party is an on-network ("on-net") subscriber (i.e., a subscriber of the service provider who owns or operates the network(s) 320, or the like), and the call is destined for a collaboration platform (e.g., GoToMeeting®, Microsoft Teams®, WebEx®, or Google® Docs, etc.), then the computing system may select route 2 345b. Alternatively, if any call or session request originates from a shared TG (e.g., shared group 270, or the like), then the computing system may select route 2 345b. Once the route has been selected, the computing system 340 may establish the SIP-based media communication session between the calling party (i.e., originator 305, or the like) and the called party (i.e., terminating party 355, or the like) via the determined communication route (e.g., route 2 345b, or the like) through the plurality of nodes in the network (e.g., network(s) 320, or the like), and via a session target (in this case, session target 2 360b) among a plurality of session targets 360a-360n.

Figure 3C:
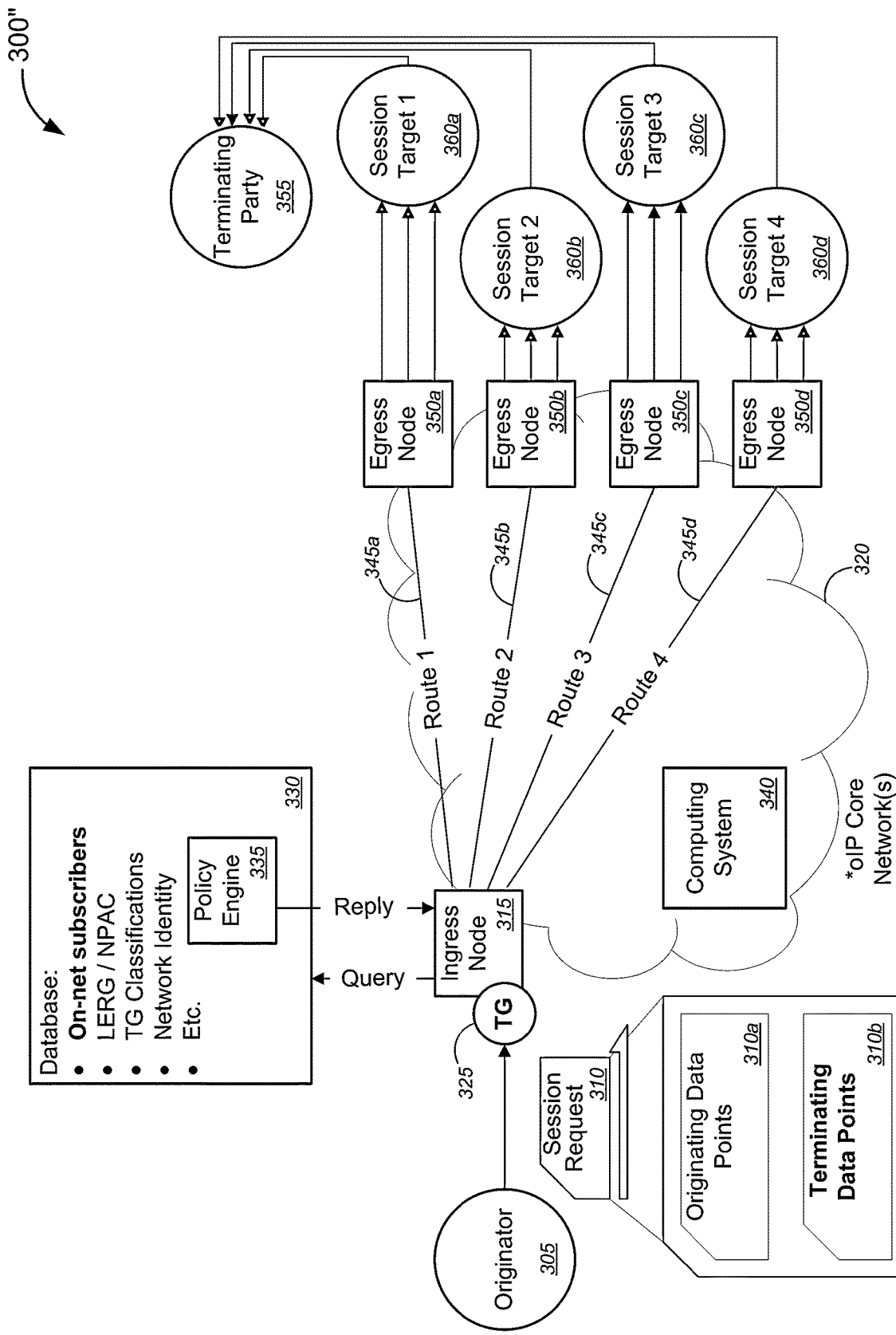

Alternatively, or additionally, with reference to FIG. 3C, determining the communication route (as described above with respect to FIG. 2) may comprise computing system 340: determining whether a first set of conditions is satisfied, the first set of conditions including, but not limited to, (i) that the request to initiate the SIP-based media communication session originates on a shared trunk group, (ii) that the originator 305 is an on-net subscriber, and (iii) that the terminating address is on a collaboration platform, and/or the like; based on a determination that the first set of conditions is satisfied, identifying a third set of routes 345a-345d among the plurality of nodes in network(s) 320 through which SIP-based media communications satisfying the first set of conditions are assigned to be routed; and selecting a third route 345c from among the identified third set of routes 345a-345d, where the determined communication route comprises the selected third route 345c. Once the route has been selected, the computing system 340 may establish the SIP-based media communication session between the calling party (i.e., originator 305, or the like) and the called party (i.e., terminating party 355, or the like) via the determined communication route (e.g., route 3 345c, or the like) through the plurality of nodes in the network (e.g., network(s) 320, or the like), and via a session target (in this case, session target 3 360c) among a plurality of session targets 360a-360n.

Figure 3D:
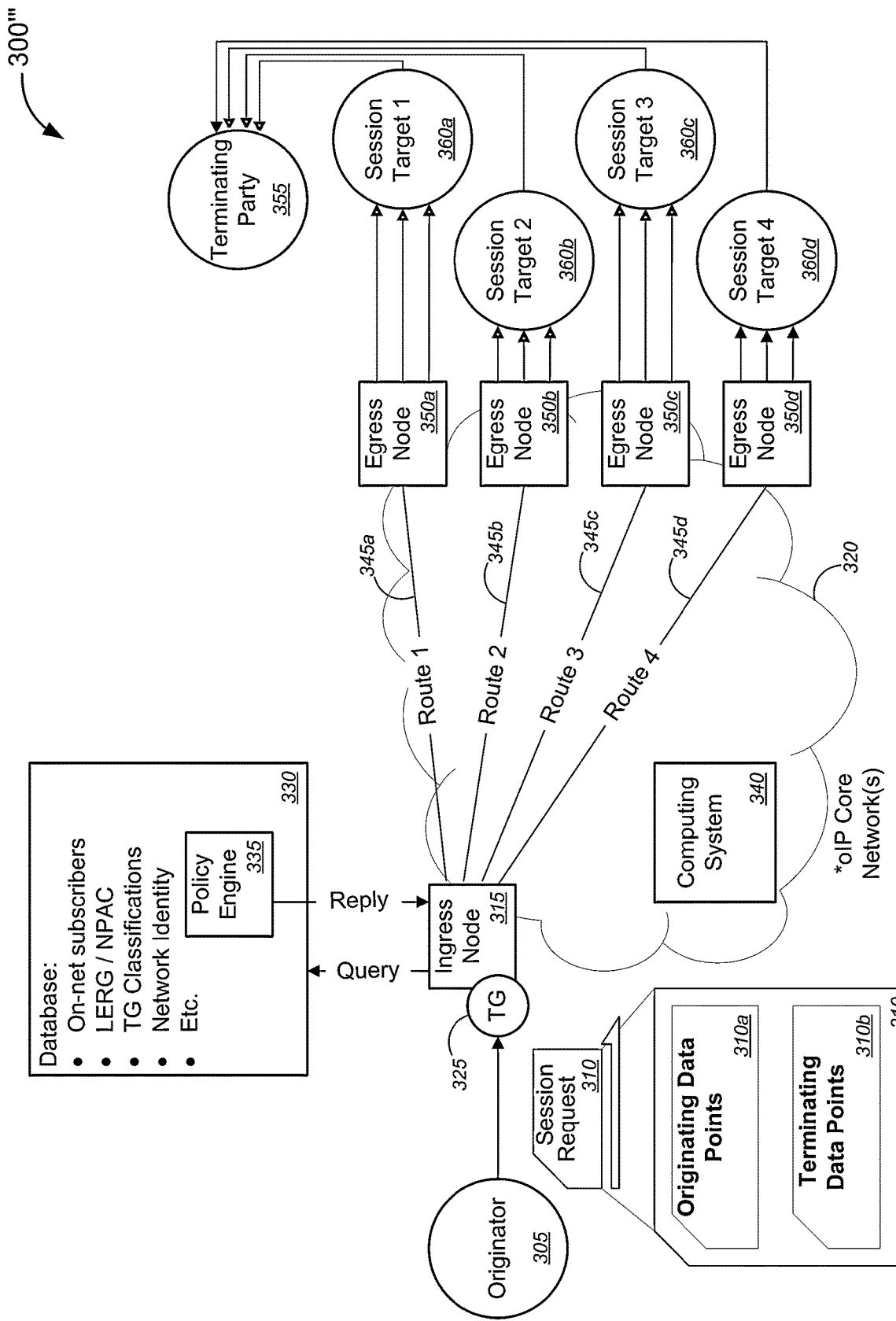

Alternatively, or additionally, referring to FIG. 3D, determining the communication route (as described above with respect to FIG. 2) may comprise computing system 340: extracting one or more first originating data points and one or more first terminating data points from the received session request 310; querying a database for one or more second originating data points and one or more second terminating data points; based on a combination of the one or more first originating data points, the one or more second originating data points, the one or more second originating data points, and the one or more second terminating data points (non-limiting examples of each of which are described above), identifying a fourth set of routes 345a-345d among the plurality of nodes in network(s) 320 through which SIP-based media communications should be routed; and selecting a fourth route 345d from among the identified fourth set of routes 345a-345d, where the determined communication route comprises the selected fourth route 345d. Once the route has been selected, the computing system 340 may establish the SIP-based media communication session between the calling party (i.e., originator 305, or the like) and the called party (i.e., terminating party 355, or the like) via the determined communication route (e.g., route 4 345d, or the like) through the plurality of nodes in the network (e.g., network(s) 320, or the like), and via a session target (in this case, session target 4 360d) among a plurality of session targets 360a-360n.

Alternatively, or additionally, although not shown in FIG. 3, if the calling party at ingress has a specific dial pattern, and the call is destined for an on-net subscriber, then the computing system may select route x 345x, and may establish the SIP-based media communication session between the calling party (i.e., originator 305, or the like) and the called party (i.e., terminating party 355, or the like) via the determined communication route (e.g., route x 345x, or the like) through the plurality of nodes in the network (e.g., network(s) 320, or the like), and via a session target (in this case, session target x 360x) among a plurality of session targets 360a-360n.

FIGS. 4A-4E (collectively, "FIG. 4") are flow diagrams illustrating a method 400 for implementing originating number or address-based route determination and routing, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 300, 300', 300", and 300'" of FIGS. 1, 2, 3A, 3B, 3C, and 3D, respectively (or components thereof), such methods may also be implemented using any suitable hardware (or software) implementation. Similarly, while each of the systems, examples, or embodiments 100, 200, 300, 300', 300", and 300'" of FIGS. 1, 2, 3A, 3B, 3C, and 3D, respectively (or components thereof), can operate according to the method 400 illustrated by FIG. 4 (e.g., by executing instructions embodied on a computer readable medium), the systems, examples, or embodiments 100, 200, 300, 300', 300", and 300'" of FIGS. 1, 2, 3A, 3B, 3C, and 3D can each also operate according to other modes of operation and/or perform other suitable procedures.

Figure 4A:
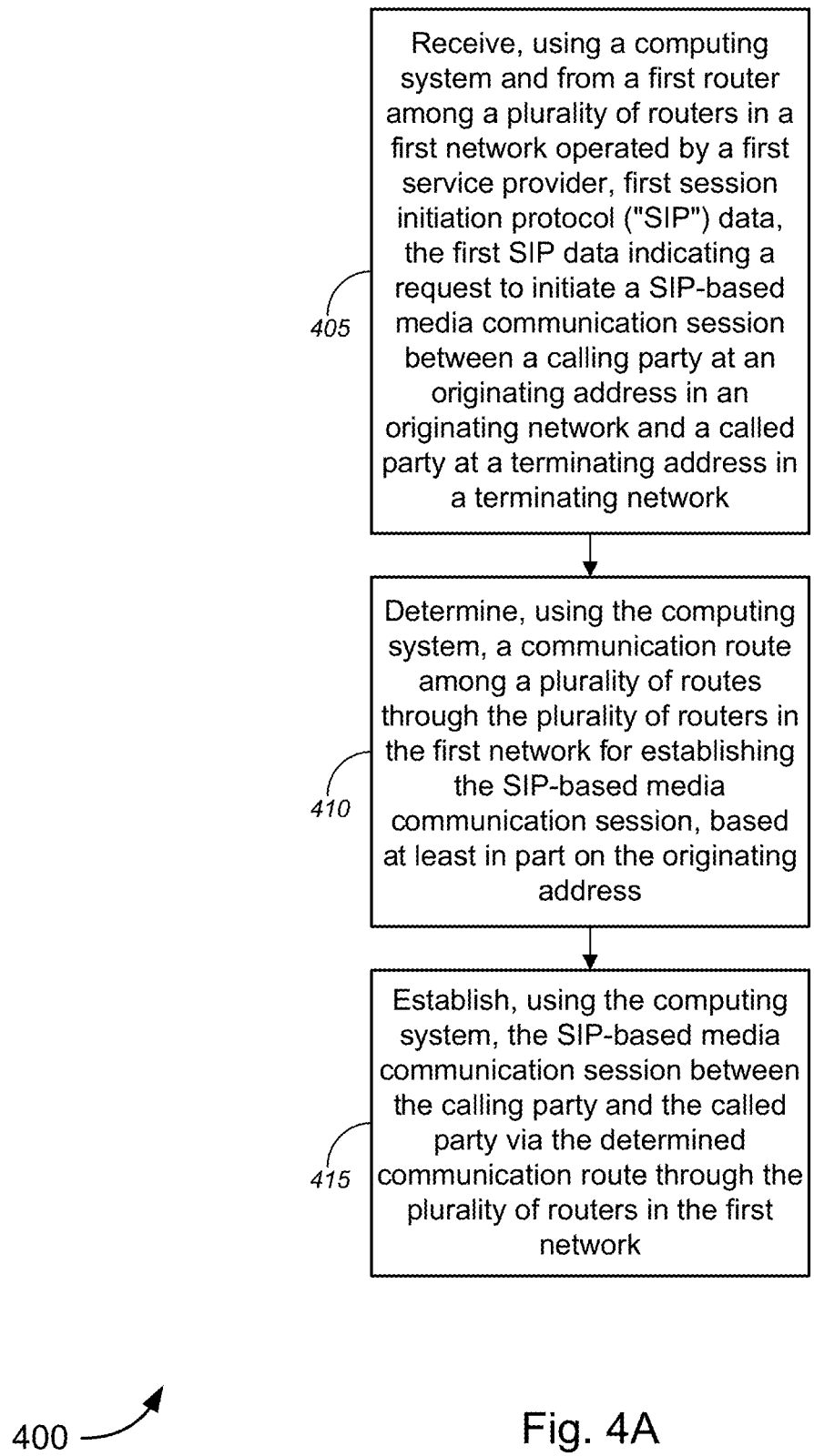
FIGS. 4A-4E are flow diagrams illustrating a method for implementing originating number or address-based route determination and routing, in accordance with various embodiments.

In the non-limiting embodiment of FIG. 4A, method 400, at block 405, may comprise receiving, using a computing system and from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network.

In some embodiments, the computing system may include, without limitation, at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like. In some instances, the SIP-based communication may include, but is not limited to, at least one of a voice over Internet Protocol ("VoIP") call, an IP-based video call, or an instant message over IP, and/or the like. In some cases, at least one of the originating network or the terminating network is the same as the first network. Alternatively, at least one of the originating network or the terminating network is different from the first network.

At block 410, method 400 may comprise determining, using the computing system, a communication route among a plurality of routes through the plurality of routers in the first network for establishing the SIP-based media communication session, based at least in part on the originating address. FIGS. 4B-4E depict various examples of determining the communication route.

Method 400 may further comprise, at block 415, establishing, using the computing system, the SIP-based media communication session between the calling party and the called party via the determined communication route through the plurality of routers in the first network.

Figures 4B, 4C:
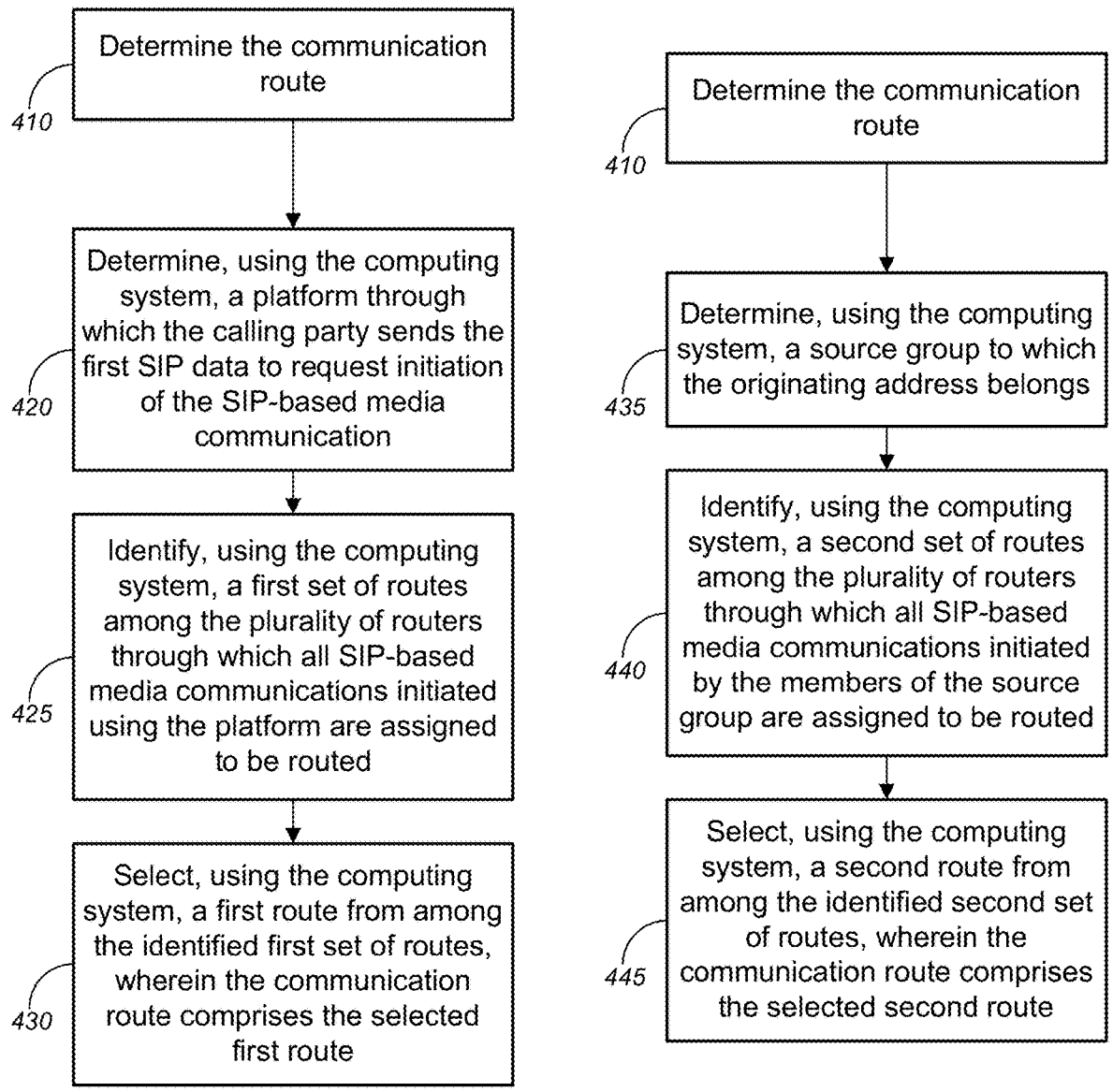

Turning to FIG. 4B, determining the communication route (at block 410) may comprise: determining, using the computing system, a platform through which the calling party sends the first SIP data to request initiation of the SIP-based media communication (block 420); identifying, using the computing system, a first set of routes among the plurality of routers through which all SIP-based media communications initiated using the platform are assigned to be routed (block 425); and selecting, using the computing system, a first route from among the identified first set of routes, wherein the communication route comprises the selected first route (block 430). According to some embodiments, the platform may include, without limitation, at least one of a teleconferencing platform, a voice call platform, a video call platform, a messaging platform, a software application-based communications platform, or a web-based communications platform, and/or the like.

Alternatively, or additionally, referring to FIG. 4C, determining the communication route (at block 410) may comprise: determining, using the computing system, a source group to which the originating address belongs (block 435); identifying, using the computing system, a second set of routes among the plurality of routers through which all SIP-based media communications initiated by the members of the source group are assigned to be routed (block 440); and selecting, using the computing system, a second route from among the identified second set of routes, wherein the communication route comprises the selected second route (block 445). In some embodiments, the source group may include, but is not limited to, one of an entity to which the calling party belongs, a trunk group assigned exclusively to the entity, or a trunk group assigned to the calling party, and/or the like.

Figure 4D:
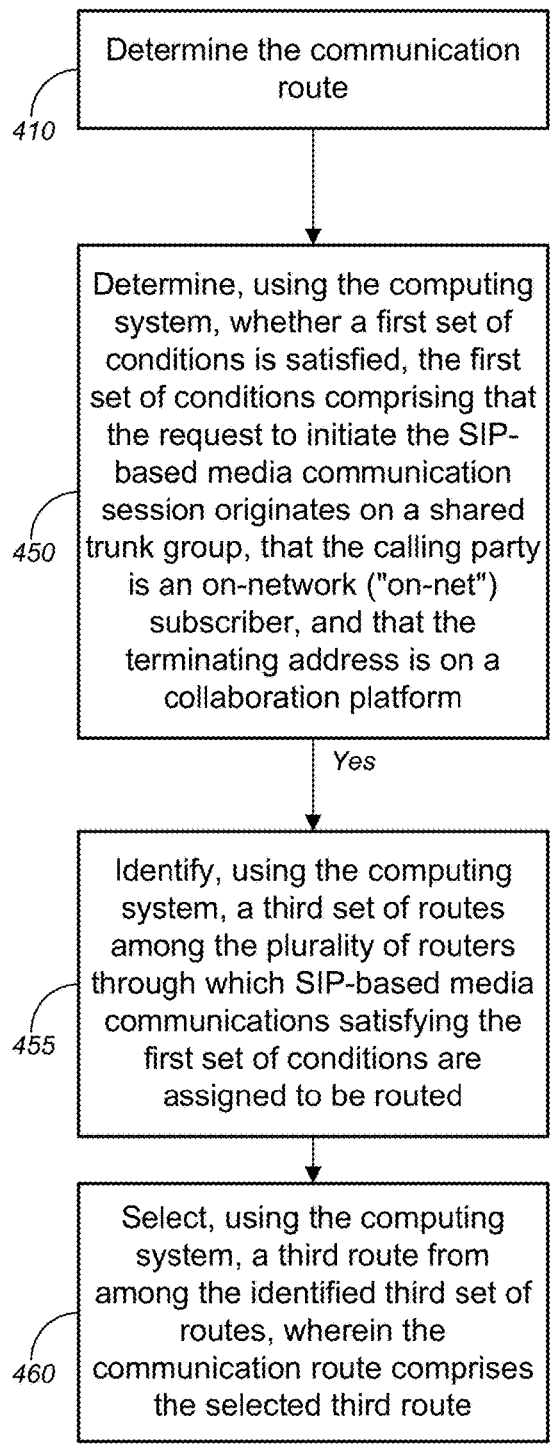

Alternatively, or additionally, referring to FIG. 4D, determining the communication route (at block 410) may comprise: determining, using the computing system, whether a first set of conditions is satisfied, the first set of conditions comprising that the request to initiate the SIP-based media communication session originates on a shared trunk group, that the calling party is an on-network ("on-net") subscriber, and that the terminating address is on a collaboration platform (block 450); based on a determination that the first set of conditions is satisfied, identifying, using the computing system, a third set of routes among the plurality of routers through which SIP-based media communications satisfying the first set of conditions are assigned to be routed (block 455); and selecting, using the computing system, a third route from among the identified third set of routes, wherein the communication route comprises the selected third route (block 460).

Figure 4E:
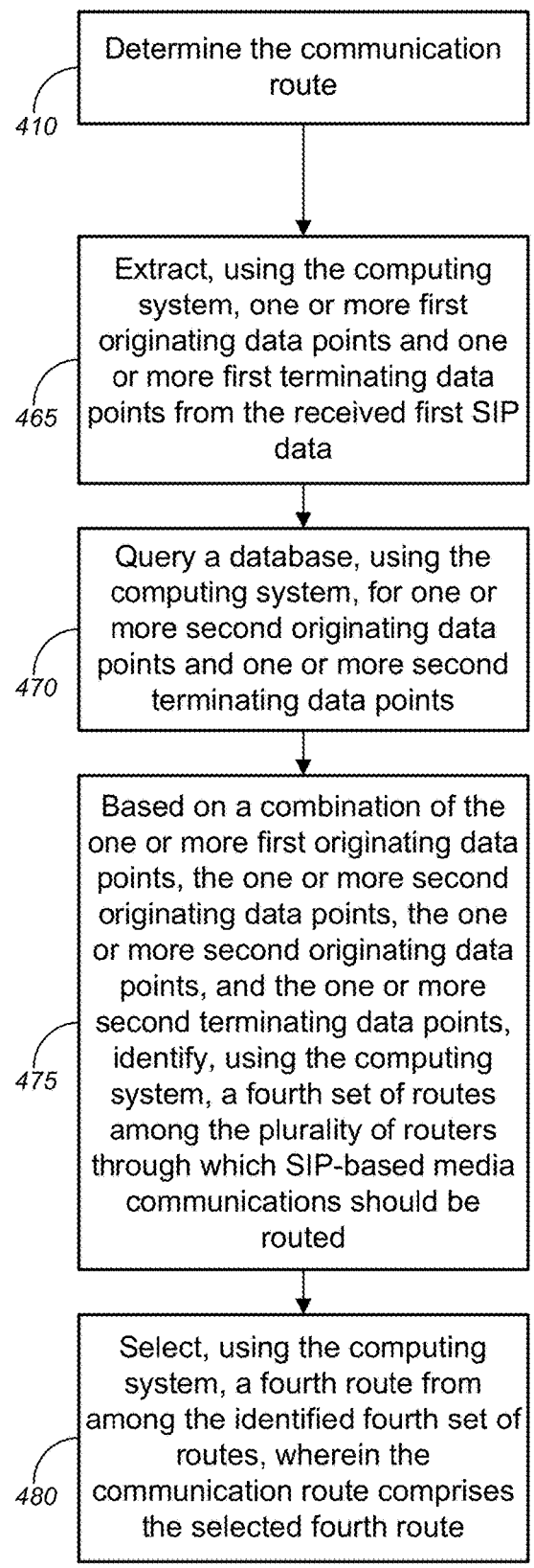

Alternatively, or additionally, referring to FIG. 4E, determining the communication route (at block 410) may comprise: extracting, using the computing system, one or more first originating data points and one or more first terminating data points from the received first SIP data (block 465); querying a database, using the computing system, for one or more second originating data points and one or more second terminating data points (block 470); based on a combination of the one or more first originating data points, the one or more second originating data points, the one or more second originating data points, and the one or more second terminating data points, identifying, using the computing system, a fourth set of routes among the plurality of routers through which SIP-based media communications should be routed (block 475); and selecting, using the computing system, a fourth route from among the identified fourth set of routes, wherein the communication route comprises the selected fourth route (block 480).

According to some embodiments, the one or more first originating data points may include, without limitation, at least one of an originating address, an originating telephone number, an originating identification code, an originating operating company number ("OCN"), an originating local routing number ("LRN"), an originating trunk group classification, or an originating network identifier, and/or the like. Similarly, the one or more first terminating data points may include, but are not limited to, at least one of a terminating address, a terminating telephone number, a terminating identification code, a terminating OCN, a terminating LRN, a terminating trunk group classification, or a terminating network identifier, and/or the like.

In some embodiments, the one or more second originating data points may include, without limitation, at least one of an indication that the calling party is an on-net subscriber, an indication that the calling party is an off-net subscriber, an indication of which service provider is associated with the originating telephone number based on one or more of local exchange routing guide ("LERG") data, number portability administration center ("NPAC") data, or local routing number ("LRN") data, an indication regarding a trunk group classification associated with the originating telephone number, or an indication regarding network identity associated with the originating address, and/or the like. Likewise, the one or more second terminating data points may include, but are not limited to, at least one of an indication that the called party is an on-net subscriber, an indication that the called party is an off-net subscriber, an indication of which service provider is associated with the terminating telephone number based on one or more of LERG data, NPAC data, or LRN data, an indication regarding a trunk group classification associated with the terminating telephone number, or an indication regarding network identity associated with the terminating address, and/or the like.

Merely by way of example, in some cases, determining the communication route may comprise determining, using the computing system, a communication route among the plurality of routers in the first network for establishing the SIP-based media communication session, based at least in part on one or more of: whether the calling party is an on-net subscriber; whether the originating network is one of the first network or a network operated by a second service provider with which the first service provider has a peering agreement; which platform the calling party or the originating address is associated with; which trunk group the calling party is assigned to; whether the trunk group to which the calling party is assigned is an exclusive trunk group; whether the trunk group to which the calling party is assigned is a shared trunk group; whether the called party is an on-net subscriber; whether the terminating network is one of the first network or a network operated by a third service provider with which the first service provider has a peering agreement; which platform the called party or the destination address is associated with; which trunk group the called party is assigned to; whether the trunk group to which the called party is assigned is an exclusive trunk group; whether the trunk group to which the called party is assigned is a shared trunk group; whether the terminating address is an incompatible endpoint; or whether any routers or nodes between the originating address are incompatible endpoints; and/or the like.

According to some embodiments, determining the communication route may comprise determining, using the computing system, a route plan, the route plan may include, without limitation, at least one of: a routing solution based on an origination operating company number ("OCN"); a routing solution including all OCNs associated with the first service provider; a routing solution including all OCNs based on the calling party's local routing number ("LRN"); a routing solution that includes overflow routes based on one or more of least cost routing ("LCR") or wide area telephone service ("WATS"); a routing solution that accepts Internet Protocol ("IP") and time-division multiplex ("TDM") originating addresses; a routing solution that accepts IP and TDM terminating routes; a routing solution that pertains only to local or long distance ("LD") toll traffic; a routing solution in which terminating routes are available via standard LCR routing environments; or a routing solution based on traffic exchange agreements ("TEAs") between the first service provider and one or more of a second service provider operating the originating network or a third service provider operating the terminating network; and/or the like.

Exemplary System and Hardware Implementation

Figure 5:
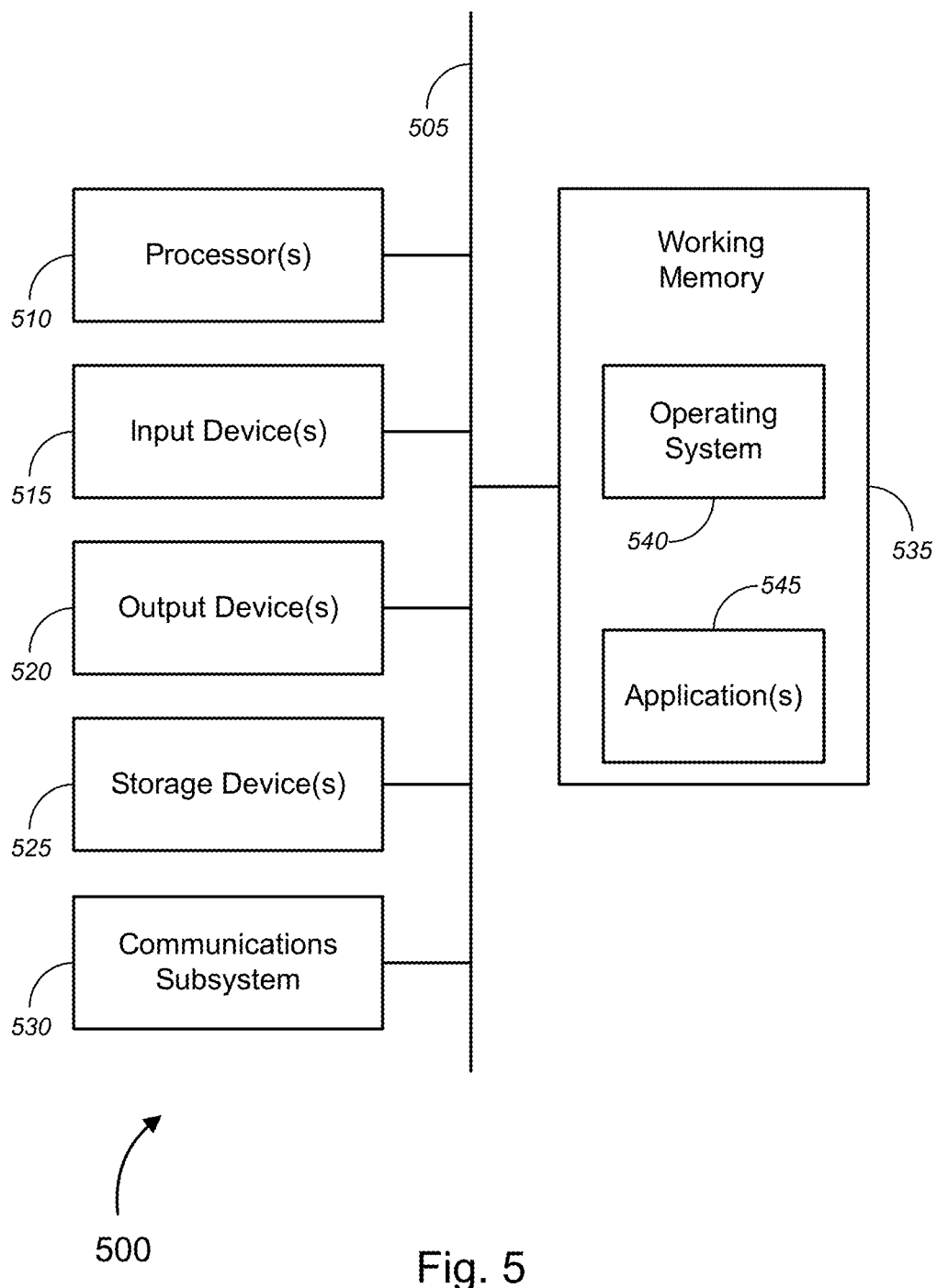
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., calling devices 105 and 105a-105e, called devices 125 and 125a-125e, ingress nodes 150a-150n, 215, and 315, egress nodes 155a-155n, 250a-250n, and 350a-350n, computing systems 160, 240, and 340, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., calling devices 105 and 105a-105e, called devices 125 and 125a-125e, ingress nodes 150a-150n, 215, and 315, egress nodes 155a-155n, 250a-250n, and 350a-350n, computing systems 160, 240, and 340, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
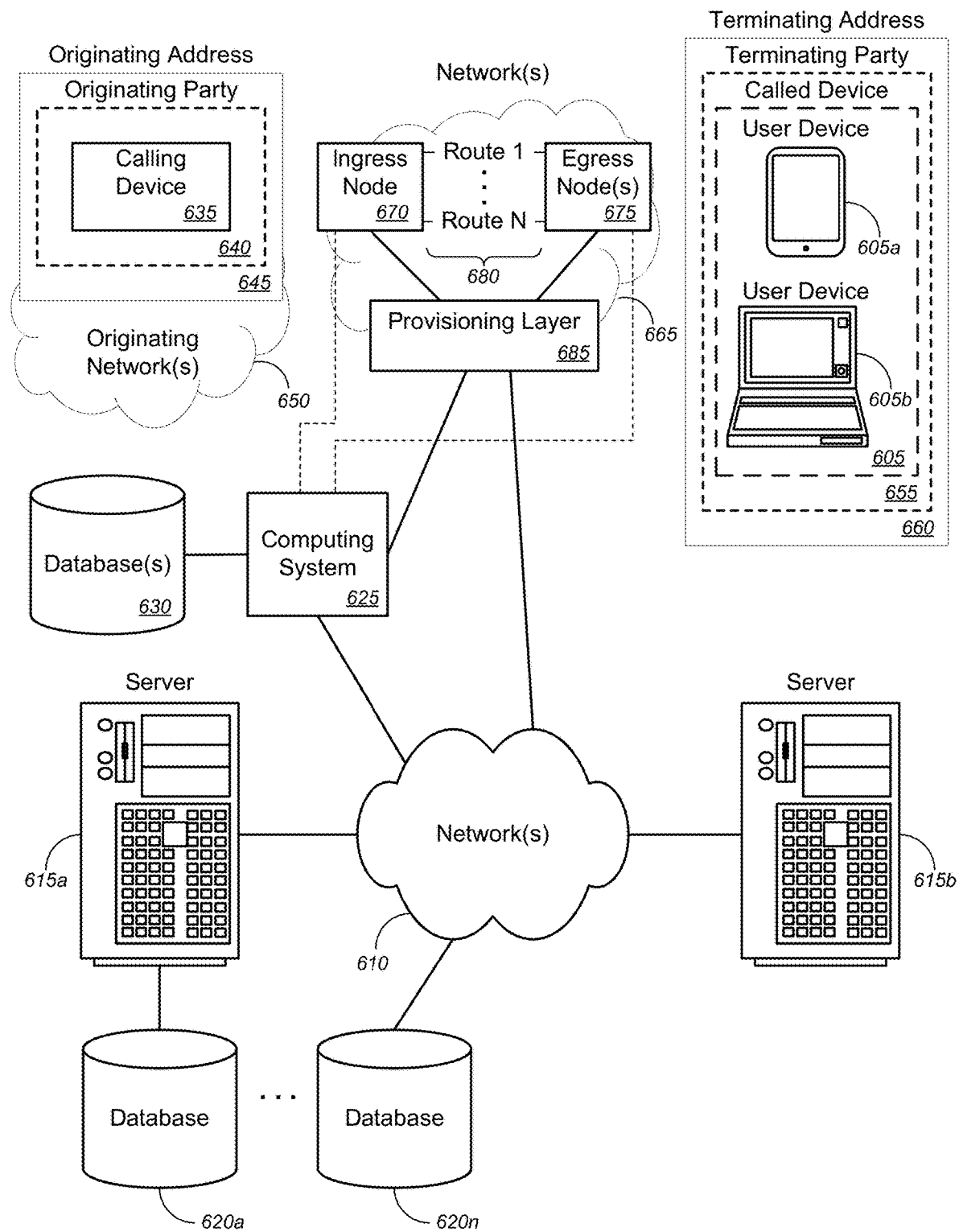
FIG. 6 is a block diagram illustrating a networked system of computers, computing systems, or system hardware architecture, which can be used in accordance with various embodiments.

As noted above, a set of embodiments comprises methods and systems for implementing call or data routing, and, more particularly, to methods, systems, and apparatuses for implementing originating number or address-based route determination and routing. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 120, 140, 145, 220, and 320 of FIGS. 1-3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing call or data routing, and, more particularly, to methods, systems, and apparatuses for implementing originating number or address-based route determination and routing, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 160, 240, and 340 of FIGS. 1, 2, and 3, or the like) and database(s) 630 (similar to database(s) 165 of FIG. 1, or the like). System 600 may further comprise a calling device 635 (similar to calling devices 105 and 105a-105e of FIG. 1, or the like) that is associated with an originating party 640 (similar to originating parties 110a-110n of FIG. 1, or the like) at a originating address 645 (similar to originating addresses 115a-115n of FIG. 1, or the like) in originating network(s) 650 (similar to originating network(s) 120 of FIG. 1, or the like), a called device 605 (including user devices 605a and 605b, or the like; similar to called devices 125 and 125a-125e of FIG. 1, or the like) that is associated with a terminating party 655 (similar to terminating parties 130a-130n of FIG. 1, or the like) at a terminating address 660 (similar to terminating addresses 135a-135n of FIG. 1, or the like) in network(s) 665 (similar to networks 145, 220, and 320 of FIGS. 1, 2, and 3, or the like). System 600 may further comprise ingress node 670 (similar to ingress nodes 150a-150n, 215, and 315 of FIGS. 1, 2, and 3, or the like), egress node 675 (similar to egress nodes 155a-155n, 250a-250n, and 350a-350n of FIGS. 1, 2, and 3, or the like), and provisioning layer 685 (similar to provisioning layer 170 of FIG. 1, or the like), each disposed in network(s) 665.

In operation, computing system 625 may receive, from a first router (e.g., ingress node 670, or the like) among a plurality of routers (e.g., the plurality of ingress nodes 670 and/or the plurality of egress nodes 675, or the like) in a first network (e.g., network(s) 665, or the like) operated by a first service provider, first SIP data, the first SIP data indicating a request to initiate a SIP-based media communication session between a calling party (e.g., originating party 640, or the like) at an originating address (e.g., originating address 645, or the like) in an originating network (e.g., originating network(s) 650, or the like) and a called party (e.g., terminating party 655, or the like) at a terminating address (e.g., terminating address 660, or the like) in a terminating network (e.g., network(s) 665, or the like).

The computing system 625 may determine a communication route (e.g., route 1, or the like) among a plurality of routes (e.g., routes 680, or the like) through the plurality of routers (e.g., the plurality of ingress nodes 670 and/or the plurality of egress nodes 675, or the like) in the first network (e.g., network(s) 665, or the like) for establishing the SIP-based media communication session, based at least in part on the originating address (e.g., originating address 645, or the like). The computing system 625 may then establish the SIP-based media communication session between the calling party (e.g., originating party 640, or the like) and the called party (e.g., terminating party 655, or the like) via the determined communication route (e.g., route 1, or the like) through the plurality of routers in the first network (e.g., network(s) 665, or the like).

Merely by way of example, in some cases, determining the communication route may comprise determining, using the computing system, a communication route among the plurality of routers in the first network for establishing the SIP-based media communication session, based at least in part on one or more of: whether the calling party is an on-net subscriber; whether the originating network is one of the first network or a network operated by a second service provider with which the first service provider has a peering agreement; which platform the calling party or the originating address is associated with; which trunk group the calling party is assigned to; whether the trunk group to which the calling party is assigned is an exclusive trunk group; whether the trunk group to which the calling party is assigned is a shared trunk group; whether the called party is an on-net subscriber; whether the terminating network is one of the first network or a network operated by a third service provider with which the first service provider has a peering agreement; which platform the called party or the destination address is associated with; which trunk group the called party is assigned to; whether the trunk group to which the called party is assigned is an exclusive trunk group; whether the trunk group to which the called party is assigned is a shared trunk group; whether the terminating address is an incompatible endpoint; or whether any routers or nodes between the originating address are incompatible endpoints; and/or the like. Herein, a "shared trunk group" (also referred to as a "common trunk group") may refer to a trunk group that carries calls that originate from more than one service type or more than one carrier.

Alternatively, or additionally, determining the communication route may comprise determining, using the computing system, a route plan, the route plan may include, without limitation, at least one of: a routing solution based on an origination operating company number ("OCN"); a routing solution including all OCNs associated with the first service provider; a routing solution including all OCNs based on the calling party's local routing number ("LRN"); a routing solution that includes overflow routes based on one or more of least cost routing ("LCR") or wide area telephone service ("WATS"); a routing solution that accepts Internet Protocol ("IP") and time-division multiplex ("TDM") originating addresses; a routing solution that accepts IP and TDM terminating routes; a routing solution that pertains only to local or long distance ("LD") toll traffic; a routing solution in which terminating routes are available via standard LCR routing environments; or a routing solution based on traffic exchange agreements ("TEAs") between the first service provider and one or more of a second service provider operating the originating network or a third service provider operating the terminating network; and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, using a computing system and from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network;
   determining, using the computing system, a communication route among a plurality of routes through the plurality of routers in the first network for establishing the SIP-based media communication session, based at least in part on the originating address; and establishing, using the computing system, the SIP-based media communication session between the calling party and the called party via the determined communication route through the plurality of routers in the first network, wherein determining the communication route comprises:
determining, using the computing system, whether a first set of conditions is satisfied, the first set of conditions comprising that the request to initiate the SIP-based media communication session originates on a shared trunk group, that the calling party is an on-network ("on-net") subscriber, and that the terminating address is on a collaboration platform;

based on a determination that the first set of conditions is satisfied, identifying, using the computing system, a third set of routes among the plurality of routers through which SIP-based media communications satisfying the first set of conditions are assigned to be routed, and selecting, using the computing system, a third route from among the identified third set of routes, wherein the communication route comprises the selected third route.

2. The method of claim 1, wherein the computing system comprises at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC.

3. The method of claim 1, wherein the SIP-based media communication session comprises at least one of a voice over Internet Protocol ("VoIP") call, an IP-based video call, or an instant message over IP.

4. The method of claim 1, wherein at least one of the originating network or the terminating network is the same as the first network.

5. The method of claim 1, wherein at least one of the originating network or the terminating network is different from the first network.

6. The method of claim 1, wherein determining the communication route comprises: determining, using the computing system, a platform through which the calling party sends the first SIP data to request initiation of the SIP-based media communication; identifying, using the computing system, a first set of routes among the plurality of routers through which all SIP-based media communications initiated using the platform are assigned to be routed; and selecting, using the computing system, a first route from among the identified first set of routes, wherein the communication route comprises the selected first route.

7. The method of claim 6, wherein the platform comprises at least one of a teleconferencing platform, a voice call platform, a video call platform, a messaging platform, a software application-based communications platform, or a web-based communications platform.

8. The method of claim 1, wherein determining the communication route comprises:

determining, using the computing system, a source group to which the originating address belongs;

identifying, using the computing system, a second set of routes among the plurality of routers through which all SIP-based media communications initiated by members of the source group are assigned to be routed; and selecting, using the computing system, a second route from among the identified second set of routes, wherein the communication route comprises the selected second route.

9. The method of claim 8, wherein the source group comprises one of an entity to which the calling party belongs, a trunk group assigned exclusively to the entity, or a trunk group assigned to the calling party.

10. The method of claim 1, wherein determining the communication route comprises:

extracting, using the computing system, one or more first originating data points and one or more first terminating data points from the received first SIP data;

querying a database, using the computing system, for one or more second originating data points and one or more second terminating data points;

based on a combination of the one or more first originating data points, the one or more second originating data points, and the one or more second terminating data points, identifying, using the computing system, a fourth set of routes among the plurality of routers through which SIP-based media communications should be routed; and selecting, using the computing system, a fourth route from among the identified fourth set of routes, wherein the communication route comprises the selected fourth route.

11. The method of claim 10, wherein the one or more first originating data points comprises at least one of an originating address, an originating telephone number, an originating identification code, an originating operating company number ("OCN"), an originating local routing number ("LRN"), an originating trunk group classification, or an originating network identifier, wherein the one or more first terminating data points comprises at least one of a terminating address, a terminating telephone number, a terminating identification code, a terminating OCN, a terminating LRN, a terminating trunk group classification, or a terminating network identifier.

12. The method of claim 11, wherein the one or more second originating data points comprises at least one of an indication that the calling party is an on-net subscriber, an indication that the calling party is an off-net subscriber, an indication of which service provider is associated with the originating telephone number based on one or more of local exchange routing guide ("LERG") data, number portability administration center ("NPAC") data, or local routing number ("LRN") data, an indication regarding a trunk group classification associated with the originating telephone number, or an indication regarding network identity associated with the originating address, wherein the one or more second terminating data points comprises at least one of an indication that the called party is an on-net subscriber, an indication that the called party is an off-net subscriber, an indication of which service provider is associated with the terminating telephone number based on one or more of LERG data, NPAC data, or LRN data, an indication regarding a trunk group classification associated with the terminating telephone number, or an indication regarding network identity associated with the terminating address.

13. The method of claim 1, wherein determining the communication route comprises determining, using the computing system, a communication route among the plurality of routers in the first network for establishing the SIP-based media communication session, based at least in part on one or more of:
  whether the calling party is an on-net subscriber; whether the originating network is one of the first network or a network operated by a second service provider with which the first service provider has a peering agreement;
  which platform the calling party or the originating address is associated with; which trunk group the calling party is assigned to; whether the trunk group to which the calling party is assigned is an exclusive trunk group; whether the trunk group to which the calling party is assigned is a shared trunk group;
  whether the called party is an on-net subscriber; whether the terminating network is one of the first network or a network operated by a third service provider with which the first service provider has a peering agreement; which platform the called party or the destination address is associated with; which trunk group the called party is assigned to;
  whether the trunk group to which the called party is assigned is an exclusive trunk group; whether the trunk group to which the called party is assigned is a shared trunk group; whether the terminating address is an incompatible endpoint; or whether any routers or nodes between the originating address are incompatible endpoints.

14. The method of claim 1, wherein determining the communication route comprises determining, using the computing system, a route plan, the route plan comprising at least one of:
  a routing solution based on an origination operating company number ("OCN"); a routing solution including all OCNs associated with the first service provider;
  a routing solution including all OCNs based on the calling party's local routing number ("LRN"); a routing solution that includes overflow routes based on one or more of least cost routing ("LCR") or wide area telephone service ("WATS");
  a routing solution that accepts Internet Protocol ("IP") and time-division multiplex ("TDM") originating addresses;
  a routing solution that accepts IP and TDM terminating routes; a routing solution that pertains only to local or long distance ("LD") toll traffic;
  a routing solution in which terminating routes are available via standard LCR routing environments; or a routing solution based on traffic exchange agreements ("TEAs") between the first service provider and one or more of a second service provider operating the originating network or a third service provider operating the terminating network.

15. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive, from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network;
determine a communication route among a plurality of routes through the plurality of routers in the first network for establishing the SIP-based media communication session, based at least in part on the originating address; and
establish the SIP-based media communication session between the calling party and the called party via the determined communication route through the plurality of routers in the first network,
wherein determining the communication route comprises:
  determining, using the computing system, whether a first set of conditions is satisfied, the first set of conditions comprising that the request to initiate the SIP-based media communication session originates on a shared trunk group, that the calling party is an on-network ("on-net") subscriber, and that the terminating address is on a collaboration platform;
  based on a determination that the first set of conditions is satisfied, identifying, using the computing system, a third set of routes among the plurality of routers through which SIP-based media communications satisfying the first set of conditions are assigned to be routed; and
  selecting, using the computing system, a third route from among the identified third set of routes, wherein the communication route comprises the selected third route.

16. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive, from a first router among a plurality of routers in a first network operated by a first service provider, first session initiation protocol ("SIP") data, the first SIP data indicating a request to initiate a SIP-based media communication session between a calling party at an originating address in an originating network and a called party at a terminating address in a terminating network;
determine a communication route among a plurality of routes through the plurality of routers in the first network for establishing the SIP-based media communication session, based at least in part on the originating address; and
establish the SIP-based media communication session between the calling party and the called party via the determined communication route through the plurality of routers in the first network,
wherein determining the communication route comprises:
  determining, using the computing system, whether a first set of conditions is satisfied, the first set of conditions comprising that the request to initiate the SIP-based media communication session originates on a shared trunk group, that the calling party is an on-network ("on-net") subscriber, and that the terminating address is on a collaboration platform;
  based on a determination that the first set of conditions is satisfied, identifying, using the computing system, a third set of routes among the plurality of routers through which SIP-based media communications satisfying the first set of conditions are assigned to be routed; and selecting, using the computing system, a third route from among the identified third set of routes, wherein the communication route comprises the selected third route.

17. The system of claim 16, wherein the computing system comprises at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC.

18. The system of claim 16, wherein the SIP-based communication comprises at least one of a voice over Internet Protocol ("VoIP") call, an IP-based video call, or an instant message over IP.

19. The system of claim 16, wherein determining the communication route comprises determining a route plan, the route plan comprising at least one of:

a routing solution based on an origination operating company number ("OCN"); a routing solution including all OCNs associated with the first service provider;

a routing solution including all OCNs based on the calling party's local routing number ("LRN"); a routing solution that includes overflow routes based on one or more of least cost routing ("LCR") or wide area telephone service ("WATS");

a routing solution that accepts Internet Protocol ("IP") and time-division multiplex ("TDM") originating addresses; a routing solution that accepts IP and TDM terminating routes; a routing solution that pertains only to local or long distance ("LD") toll traffic;

a routing solution in which terminating routes are available via standard LCR routing environments; or a routing solution based on traffic exchange agreements ("TEAs") between the first service provider and one or more of a second service provider operating the originating network or a third service provider operating the terminating network.

\* \* \* \* \*